(12) United States Patent
Gonzalez

(10) Patent No.: US 8,901,970 B2
(45) Date of Patent: Dec. 2, 2014

(54) HIGH VOLTAGE INVERTER UTILIZING LOW VOLTAGE OXIDE MOFSET DEVICES

(71) Applicant: Broadcom Corporation, Irvine, CA (US)

(72) Inventor: Alberto Gonzalez, Chandler, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/852,783

(22) Filed: Mar. 28, 2013

(65) Prior Publication Data

US 2014/0292377 A1     Oct. 2, 2014

(51) Int. Cl.
*H03K 3/00* (2006.01)

(52) U.S. Cl.
USPC ............................. 327/108; 327/112

(58) Field of Classification Search
USPC ................................. 327/108–112
See application file for complete search history.

(56) References Cited

U.S. PATENT DOCUMENTS

| | | | |
|---|---|---|---|
| 5,465,054 A * | 11/1995 | Erhart | 326/34 |
| 5,939,932 A * | 8/1999 | Lee | 327/436 |
| 5,973,534 A * | 10/1999 | Singh | 327/309 |
| 6,392,440 B2 * | 5/2002 | Nebel | 326/81 |
| 6,980,032 B1 * | 12/2005 | Blankenship | 326/81 |
| 7,173,472 B2 * | 2/2007 | Chen et al. | 327/333 |
| 7,659,748 B2 * | 2/2010 | Chandra | 326/83 |
| 7,940,083 B2 * | 5/2011 | Yamashita | 326/82 |

* cited by examiner

*Primary Examiner* — Kenneth B. Wells
(74) *Attorney, Agent, or Firm* — Sterne, Kessler, Goldstein & Fox P.L.L.C.

(57) ABSTRACT

An inverter circuit includes an input stage and an output stage, each including pairs of complementary transistors having low-voltage oxides. The transistors within the input stage are configured to receive the input signal and to provide control voltages in response to input signal voltage variations. The voltage level of one control voltage is clamped between an intermediate voltage and a high voltage, and the voltage level of the other control voltage is clamped between the intermediate voltage and a low voltage. The switching states of each complementary transistor in the output stage are controlled by the control voltages, which results in an output signal voltage varying between the high and the low voltage. The voltage clamping advantageously allows the inverter circuit to switch between the high and the low voltage level without exceeding a maximum gate-source or a gate-drain voltage rating for any transistor, and without requiring additional passive components.

20 Claims, 2 Drawing Sheets

HIGH VOLTAGE INVERTER UTILIZING LOW VOLTAGE OXIDE MOFSET DEVICES

FIELD OF DISCLOSURE

The present disclosure relates generally to inverters and more specifically to inverters utilizing low voltage oxides to transfer high voltage signals.

BACKGROUND

Inverters and buffers are often implemented with transistors and ensure that signal voltage levels are maintained to allow interconnected electronic components to properly interface and communicate with one another.

As electronic devices have evolved, the size of transistors has been reduced to save cost and to reduce the overall size of integrated circuits and other devices in which the transistors are implemented. In addition, voltage logic standards have also decreased to allow transistors to utilize less power and to support higher bus speeds, as less time is required to change between logic states utilizing lower voltages. In order to maintain backward compatibility, it is desirable for existing integrated circuits to implement transistors which support both existing low voltage logic standards and older high voltage logic standards. However, reducing transistor size also reduces the allowable gate-source, gate-drain, and source-drain voltages which may be applied to the transistor oxide without damaging the transistor or reducing the transistor's life. Furthermore, adding passive components (such as resistors) to an integrated circuit to reduce excessive voltage levels also increases the overall cost and size of the integrated circuit.

BRIEF DESCRIPTION OF THE DRAWINGS/FIGURES

Figure 1:
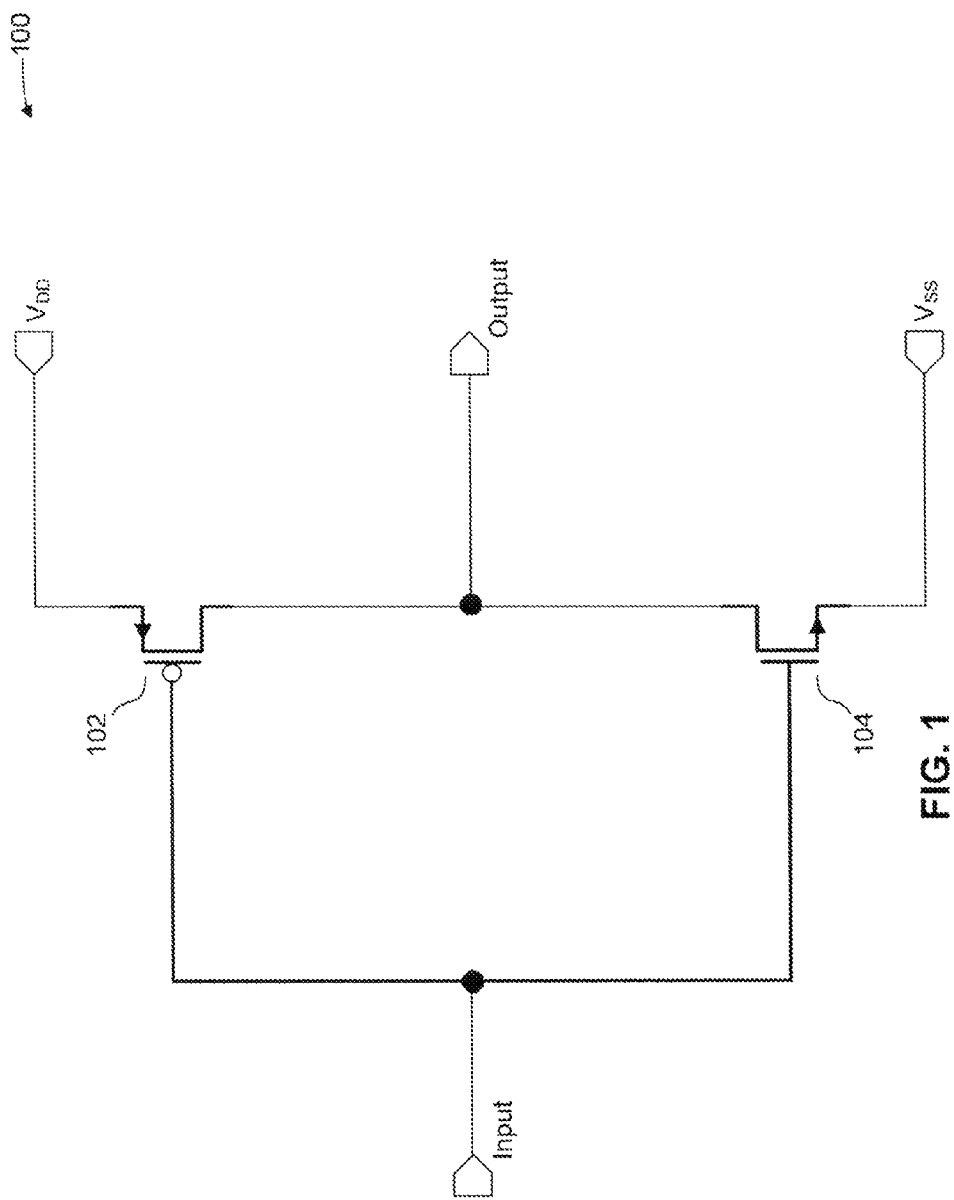
FIG. 1 illustrates a conventional inverter circuit as is known in the art.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment." "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

FIG. 1 illustrates a conventional inverter circuit as is known in the art. Inverter circuit 100 includes a p-type metal oxide semiconductor field effect transistor (MOSFET) 102, an n-type MOSFET 104, an input node which receives an input signal, an output node which provides an output signal, and voltage sources VDD and VSS.

Inverter circuit 100 receives an input signal which produces varying voltage levels at the input node. In one embodiment, the voltage levels at the input node vary between VDD and VSS. For 3.3V logic levels, VDD and VSS are 3.3V and 0V, respectively. When a voltage at the input node exceeds a threshold gate voltage required to turn on n-type MOSFET 104, then MOSFET 104 conducts and drives the voltage at the output node to 0V. N-type MOSFET 104 is off, or is non-conducting, when the voltage at the input node is less than its threshold gate voltage. Conversely, when a voltage at the input node drops below the threshold gate voltage required to turn on p-type MOSFET 102, then MOSFET 102 conducts and drives the voltage at the output node to 3.3V. P-type MOSFET 102 is off when the voltage at the input node is greater than its threshold gate voltage.

The inverter circuit 100 therefore provides an output signal having a voltage that varies between VDD and VSS in response to the voltage levels of the input signal. However, in performing this voltage switching, p-type MOSFET 102 and n-type MOSFET 104 both develop gate-source and gate-drain voltages of (VDD–VSS), or 3.3V. Thinner transistor oxides are not capable of handling gate-source or gate-drain voltages at these voltage levels without permanently damaging the transistors and/or over-stressing them, which may result in a reduction of operational life. Therefore, it is not practical to implement inverter circuit 100 using transistors having oxides incapable of handling these voltage logic levels.

Figure 2:
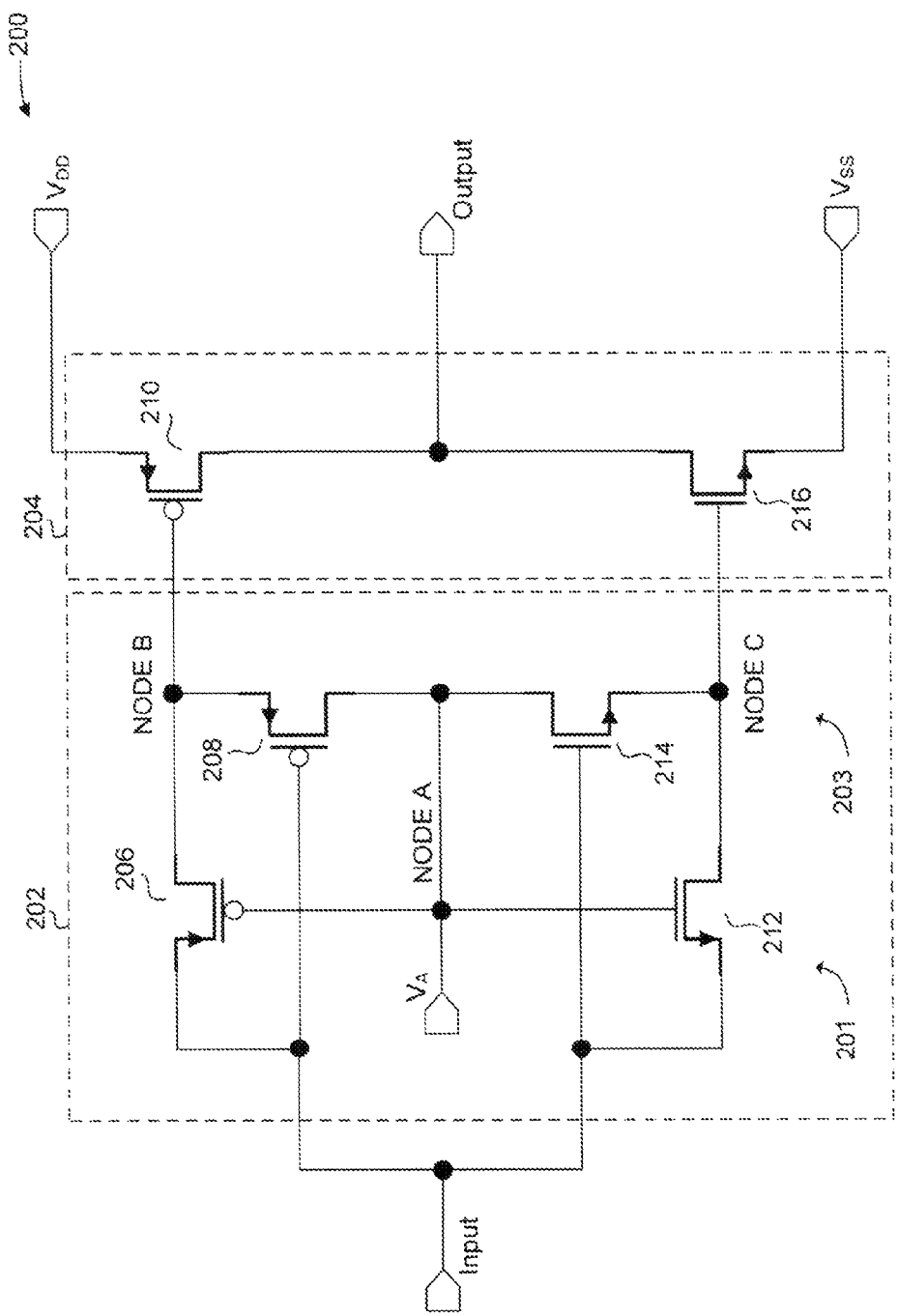
FIG. 2 illustrates an inverter circuit according to an exemplary embodiment of the disclosure.

FIG. 2 illustrates an inverter circuit according to an exemplary embodiment of the disclosure. Inverter circuit 200 includes an input stage 202, an output stage 204, an input node configured to receive an input signal, an output node configured to provide an output signal, and voltage sources VA, VDD, and VSS.

In accordance with an exemplary embodiment of the present disclosure, VDD provides a high logic level voltage, VSS provides a low logic level voltage, and VA provides an intermediate voltage which is between VDD and VSS. As will be appreciated by those skilled in the art. VDD, VSS, and VA may provide predetermined and/or adjustable voltage levels based on an implemented logic voltage standard.

Input stage 202 is configured to receive an input signal which provides voltage levels varying between VDD and VSS at the input node. Input stage 202 provides control voltages at nodes B and C in response to variations in the input node voltage. The control voltage at node B varies between VA and VDD, and the control voltage at node C varies between VSS and VA. When the input node voltage is a low logic level voltage of VSS, the control voltage at node B is driven to VA and the voltage at node C is driven to VSS. When the input node voltage is a high logic level voltage of VDD, the control voltage at node B is driven to VDD and the voltage at node C is driven to VA.

Output stage 204 is configured to receive the control voltages at nodes B and C and to provide an output signal having voltage levels varying between VDD and VSS at the output node. When the control voltage at node B is VA and the control voltage at node C is VSS, the voltage at the output node is VDD. When the control voltage at node B is VDD and the control voltage at node C is VA, then the voltage at the output node is VSS. In this way, inverter circuit 200 provides an output voltage that inverts the voltage at the input node, such that a high logic level voltage at the input node results in a low logic level voltage at the output node, and vice-versa.

In accordance with an embodiment of the present disclosure, the output node of inverter circuit 200 is coupled to the input node of a second inverter circuit 200. In such an embodiment, the output of the second inverter circuit 200 will provide an output voltage that mirrors the voltage levels at the input node of the first inverter circuit 200. In this way, a voltage buffer can be implemented using two inverter circuits 200 that are series coupled together.

Input stage 202 includes two driver circuits 201 and 203. Driver circuit 201 includes a p-type transistor 206 and an n-type transistor 212 forming a first complementary transistor pair. Driver circuit 203 includes a p-type transistor 208 and an n-type transistor 214 forming a second complementary transistor pair. In accordance with an exemplary embodiment of the present disclosure, p-type transistors 206 and 208, and n-type transistors 212 and 214 are MOSFETs. P-type transistor 206 and n-type transistor 212 each have their respective gate electrodes coupled to node A, which is coupled to a voltage source providing the voltage VA, their respective source electrodes coupled to the input node, and their respective drain electrodes coupled to respective nodes B and C, as shown. P-type transistor 208 and n-type transistor 214 each have their respective gate electrodes coupled to the input node, their respective drain electrodes coupled to the voltage source providing the voltage VA, and their respective source electrodes coupled to nodes B and C.

When the input node voltage is less than VA, p-type transistor 206 limits the voltage transferred from the input node to node B to voltages between VA and VDD, since p-type transistor 206 cannot conduct to transfer a source voltage to its drain when its source voltage is less than its gate voltage. Furthermore, when the input node voltage is less than VA, p-type transistor 206 is subject to a voltage threshold increase Vtp across its drain and source electrodes, such that node B is driven to voltage (VA+Vtp).

Similarly, when the input node voltage is greater than VA, n-type transistor 212 limits the voltage transferred from the input node to node C to voltages between VSS and VA, since n-type transistor 212 cannot conduct to transfer a source voltage to its drain when its source voltage is greater than its gate voltage. Furthermore, when the input node voltage is greater than VA, n-type transistor 212 is subject to a voltage threshold decrease Vtn across its drain and source electrodes, such that node C is driven to voltage (VA−Vtn).

Therefore, the first driver circuit 201 initially clamps the voltages at nodes B and C such that only voltages between (VA+Vtp) and VDD are provided at node B, and only voltages between VSS and (VA−Vtn) are provided at node C. These initially clamped voltages will be "pulled-up" or "pulled-down", as discussed below.

The second driver circuit 203 performs a voltage "pull-up" or "pull-down" function to compensate for the voltage threshold drops (or increases) within the transistors of the first driver circuit 201. Because the gate electrodes of p-type transistor 208 and n-type transistor 214 are coupled to the input node, which varies between VSS and VDD, p-type transistor 208 and n-type transistor 214 are not subject to voltage threshold drops across their respective drain and source electrodes. As a result, p-type transistor 208 conducts when the input node voltage is VSS and the voltage at node B is (VA+Vtp), driving node B to VA. Furthermore, n-type transistor 214 conducts when the input node voltage is VDD and the voltage at node C is (VA−Vtn), driving node C to VA.

The output stage 204 includes a third driver circuit comprising a p-type transistor 210 and an n-type transistor 216 forming a third complementary transistor pair. In accordance with an exemplary embodiment of the present disclosure, p-type transistor 210 and n-type transistor 216 are MOSFETs. P-type transistor 210 and n-type transistor 216 each have their respective gate electrodes coupled to nodes B and C, their respective source electrodes coupled to voltage sources providing the voltages VDD and VSS, and their drain electrodes coupled to the output node. The pull-up and pull-down compensation performed by the second driver circuit 203 ensures that the voltages at nodes B and C are sufficiently low and high enough to exceed the gate threshold voltages of p-type transistor 210 and n-type transistor 216, respectively. Therefore, p-type transistor 210 drives the output node to VDD when node B is at VA, and n-type transistor 216 drives the output node to VSS when node C is at VA.

In accordance with an embodiment of the present disclosure, the transistors within the input stage 202 are manufactured having oxides with gate-source and gate-drain maximum voltage ratings greater than VA but less than VDD. However, because the voltage at node B is clamped between VA and VDD, and the voltage at node C is clamped between VSS and VA, none of the transistors within the input stage 202 develop gate-source or gate-drain voltages in excess of (VDD−VA) or (VA−VS). Therefore, none of the transistors within the input stage 202 are over-stressed when the voltage at the output node is switched between VDD and VSS.

In accordance with an exemplary embodiment of the present disclosure, VDD is 3.3V, VSS is 0V, and VA is 1.8V. In accordance with such an embodiment, when the input node is at 0V, the source electrodes of p-type transistor 206 and n-type transistor 212 are at 0V, and the gate electrodes of p-type transistor 206 and n-type transistor 212 are at 1.8V. The gate electrodes of p-type transistor 208 and n-type transistor 214 are at 0V, and the drain electrodes of p-type transistor 208 and n-type transistor 214 are at 1.8V. In such a configuration, n-type transistor 214 is non-conducting, and n-type transistor 212 is conducting, thereby transferring the 0V input node voltage to drive node C to 0 V.

However, because p-type transistor 206 has a gate voltage greater than its source voltage, p-type transistor 206 is subject to a voltage threshold increase Vtp between its source and drain electrodes. This voltage threshold increase limits the voltage at its drain whereby a conductive channel between its source and drain electrodes can be formed. As a result, p-type transistor 206 forms a conducting channel between its source and drain electrodes only for drain voltages at and above (1.8V+Vtp). Therefore, when the source electrode of p-type transistor 206 is at 0V, p-type transistor 206 will only conduct for source-drain voltages exceeding (1.8V+Vtp).

With the input node voltage at 0V and node B at (1.8V+Vtp), p-type transistor 208 is conducting, pulling the voltage at node B down to 1.8V. Therefore, when the voltage at the input node changes from 3.3V to 0V, a transient period of time exists in which p-type transistor 206 is conducting until p-type transistor 208 conducts, pulling the voltage at node B down to 1.8 V. Once the voltage at node B is at a voltage which is less than (1.8V+Vtp), p-type transistor 206 no longer conducts. Therefore, p-type transistors 206 and 208 are not in contention with one another while node B is driven to 1.8V. Furthermore, because the lowest voltage at the input node is 0V, the lower voltage at node B is clamped at 1.8V. Due to this clamping, neither p-type transistor 206 nor p-type transistor 208 develop a gate-source or gate-drain voltage in excess of 1.8V.

With the input node voltage at 0V, node B has a voltage at 1.8V and node C has a voltage at 0V. As a result, p-type transistor 210 is conducting and n-type transistor 216 is non-conducting, and the voltage at the output node is driven to 3.3V. P-type transistor 210 does not develop a gate-source or gate-drain voltage in excess of 1.8V, since its gate voltage is at 1.8V, resulting in gate-drain and gate-source voltages of 1.5V.

The source-drain and gate-drain voltages at p-type transistor 210 and n-type transistor 216 can be as high as 3.3V for logic levels corresponding to 3.3V and 0V. However, p-type transistor 210 and n-type transistor 216 may be manufactured to tolerate such voltage levels as long as the gate-source voltage of each respective transistor remains below a rated voltage, such as 1.8V, for example. In accordance with an embodiment of the present disclosure, p-type transistor 210 and n-type transistor 216 are manufactured as high-voltage drain devices, and include laterally diffused drain extensions resulting in an increased source-drain series resistance. This increased source-drain series resistance allows the p-type transistor 210 and n-type transistor 216 to withstand greater source-drain and gate-drain voltages. However, because none of the transistors within input stage 202 develop source-drain or gate-drain voltages in excess of 1.8V, these transistors may be manufactured without such drain extensions.

The state of each transistor within the inverter circuit 200 is summarized below in Table I for an input node voltage of 0V.

TABLE 1

| Transistor | Conducting State |
|---|---|
| 206 | ON for VB > 1.8 V + Vtp |
| 208 | ON |
| 210 | ON |
| 212 | ON |
| 214 | OFF |
| 216 | OFF |

With the input node voltage at 3.3V, the source electrodes of p-type transistor 206 and n-type transistor 212 are at 3.3V, and the gate electrodes of p-type transistor 206 and n-type transistor 212 are at 1.8V. The gate electrodes of p-type transistor 208 and n-type transistor 214 are at 3.3V, and the drain electrodes of p-type transistor 208 and n-type transistor 214 are at 1.8V. In such a configuration, p-type transistor 208 is non-conducting, while p-type transistor 206 is conducting, thereby transferring the 3.3V input node voltage to drive node B to 3.3V.

However, because n-type transistor 212 has a gate voltage less than its source voltage, n-type transistor 212 is subject to a voltage threshold decrease Vtn between its source and drain electrodes. This voltage threshold decrease limits the voltage at the drain whereby a conductive channel between its source and drain electrodes can be formed. As a result, n-type transistor 212 forms a conducting channel between its source and drain electrodes only for drain voltages at and below (1.8V−Vtn). Therefore, when the source electrode of n-type transistor 212 is at 3.3V, n-type transistor 212 will only conduct for source-drain voltages which are below (1.8V−Vtn).

With the input node voltage at 3.3V and node C at (1.8V−Vtn), n-type transistor 214 is conducting, pulling the voltage at node C up to 1.8V. Therefore, when the voltage at the input node changes from 0V to 3.3V, a transient period of time exists in which n-type transistor 212 is conducting until n-type transistor 214 conducts, pulling the voltage at node C up to 1.8 V. Once the voltage at node C is at a voltage which is greater than (1.8V−Vtn, n-type transistor 212 no longer conducts. Therefore, n-type transistors 212 and 214 are not in contention with one another while node C is driven to 1.8V. Furthermore, because the highest voltage at the input node is 3.3V, the upper voltage at node C is clamped at 1.8V. Due to this clamping, neither n-type transistor 212 nor n-type transistor 214 develops a gate-source or gate-drain voltage in excess of 1.8V.

With the input node voltage at 3.3V, node C has a voltage at 1.8V and node B has a voltage at 3.3V. As a result, n-type transistor 216 is conducting and p-type transistor 210 is non-conducting, and the voltage at the output node is driven to 0V. N-type transistor 216 does not develop a gate-source or gate-drain voltage in excess of 1.8V, since its gate voltage is at 1.8V, resulting in gate-drain and gate-source voltages of 0V.

The state of each transistor within the inverter circuit 200 is summarized below in Table 2 for an input node voltage of 3.3V.

TABLE 2

| Transistor | Conducting State |
|---|---|
| 206 | ON |
| 208 | OFF |
| 210 | OFF |
| 212 | ON for VC < 1.8 V − Vtn |
| 214 | ON |
| 216 | ON |

Although the description of the present disclosure is described in terms of MOSFETs, those skilled in the relevant art(s) will recognize that the present disclosure may be applicable to other circuits that are capable of limiting and controlling input voltages to provide output voltage switching without departing from the spirit and scope of the present disclosure. For example, although the present disclosure is described using MOSFETS, those skilled in the relevant art(s) will recognize that bipolar junction transistors (BJTs) or any other type of transistor may be implemented without departing from the spirit and scope of the present disclosure. Furthermore, although FIG. 2 is illustrative of typical MOSFET schematic terminals such as gate, source, and drain electrodes, those skilled in the relevant art(s) will also recognize that the source and drain terminals can be reversed if symmetric MOSFETs are implemented without departing from the spirit and scope of the present disclosure.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail may be made therein without departing from the spirit and scope of the disclosure. Thus the disclosure should not be limited by any of the above-described exemplary embodiments, but should be defined only in accordance with the following claims and their equivalents.

Embodiments of the invention may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals. etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

What is claimed is:

1. An inverter circuit, comprising:
    an input stage coupled to a first voltage source providing a first voltage, the input stage being configured to receive an input signal and to provide a first control voltage and a second control voltage in response to voltage variations in the input signal; and
    an output stage configured to provide an output signal providing a voltage which varies between a second voltage and a third voltage in response to the first control voltage and the second control voltage;
    wherein the input stage includes first and second complementary pairs of transistors, the first complementary pair of transistors directly coupled together at a common node that receives the first voltage, and the second complementary pair of transistors directly coupled together at the common node to receive the first voltage;
    wherein a voltage of the input signal varies between the second voltage and the third voltage;
    wherein the first control voltage varies between the first voltage and the second voltage; and
    wherein the second control voltage varies between the first voltage and the third voltage.

2. The inverter circuit of claim 1, wherein the output signal provides a voltage equal to the third voltage when the input signal provides a voltage equal to the second voltage.

3. The inverter circuit of claim 1, wherein the output signal provides a voltage equal to the second voltage when the input signal provides a voltage equal to the third voltage.

4. The inverter circuit of claim 1, wherein the output stage comprises:
    a p-type metal oxide semiconductor field effect transistor (MOSFET) having a gate electrode coupled to the first control voltage and a source electrode coupled to a second voltage source providing the second voltage; and
    an n-type MOSFET having a gate electrode coupled to the second control voltage and a source electrode coupled to a third voltage source providing the third voltage;
    wherein the p-type MOSFET conducts when the first control voltage is substantially equal to the first voltage; and
    wherein the n-type MOSFET conducts when the second control voltage is substantially equal to the first voltage.

5. The inverter circuit of claim 1,
    wherein no transistor from among the first and the second complementary pair of transistors develops a gate-source voltage or a gate-drain voltage in excess of a corresponding maximum gate-source or gate-drain voltage rating for voltage variations in the output signal; and
    wherein the maximum gate-source and gate-drain voltage ratings are less than or substantially equal to the second voltage.

6. The inverter circuit of claim 1, wherein the input stage and the output stage include only transistors.

7. The inverter circuit of claim 1, wherein the first voltage is 1.8 Volts, wherein the second voltage is 3.3 Volts, and wherein the third voltage is 0 Volts.

8. An inverter circuit, comprising:
    a first driver circuit coupled to a first voltage source, the first voltage source being configured to provide a first voltage, the first driver circuit being configured to receive an input signal having a voltage varying between a second voltage and a third voltage, the second voltage being greater than the first voltage, and the third voltage being less than the first voltage, the first driver circuit being further configured to provide a first control voltage and a second control voltage in response to the input signal, the first control voltage varying between the second voltage and a fourth voltage, and the second control voltage varying between the third voltage and a fifth voltage;
    a second driver circuit coupled to the first voltage source, the second driver circuit being configured to receive the input signal and to adjust the fourth and the fifth voltage to substantially equal the first voltage; and
    a third driver circuit configured to provide an output signal providing the second voltage when the first control voltage is substantially equal to the first voltage, and to provide the output signal providing the third voltage when the second control voltage is substantially equal to the first voltage;
    wherein the first driver circuit includes first an second gate terminals directly coupled together at a common node that receives the first voltage, and the second driver circuit includes first and second drain terminals directly coupled together at the common node to receive the first voltage.

9. The inverter circuit of claim 8, wherein the first driver circuit, the second driver circuit, and the third driver circuit each comprise:
    a complementary pair of metal oxide field-effect transistors (MOSFETS).

10. The inverter circuit of claim 9, wherein a difference between the fourth voltage and the first voltage is a voltage threshold increase associated with a p-type MOSFET of the first driver circuit; and
    wherein a difference between the fifth voltage and the first voltage is a voltage threshold decrease associated with an n-type MOSFET of the first driver circuit.

11. The inverter circuit of claim 8, wherein the first driver circuit, the second driver circuit, and the third driver circuit include only transistors.

12. The inverter circuit of claim 8, wherein the output signal provides:
    a voltage substantially equal to the third voltage when the input signal provides a voltage substantially equal to the second voltage; and
    a voltage substantially equal to the second voltage when the input signal provides a voltage substantially equal to the third voltage.

13. The inverter circuit of claim 8, wherein the first voltage is 1.8 Volts, wherein the second voltage is 3.3 Volts, and wherein the third voltage is 0 Volts.

14. The inverter circuit of claim 9, wherein the first voltage is a voltage such that no transistor from among the first driver circuit and the second driver circuit develops a gate-source voltage or a gate-drain voltage in excess of a corresponding maximum gate-source or gate-drain voltage rating for voltage variations in the output signal; and wherein the maximum gate-source and gate-drain voltage ratings are less than or substantially equal to the second voltage.

15. An inverter circuit, comprising:

a first complementary pair of transistors, a gate electrode of each transistor of the first complementary pair of transistors being directly coupled to one another to form a first node and coupled to a first voltage source at the first node, and a source electrode of each transistor of the first complementary pair of transistors being coupled to one another and to an input signal to form a second node;

a second complementary pair of transistors, a gate electrode of each transistor of the second complementary pair of transistors being coupled to the second node, and a drain electrode of each transistor of the second complementary pair of transistors being directly coupled to one another at the first node; and a third complementary pair of transistors, a source electrode of each transistor of the third complementary pair of transistors being coupled to a second voltage source and to a third voltage source, respectively, and a drain electrode of each transistor of the third complementary pair of transistors being directly coupled to one another to form a third node providing an output signal;

wherein a drain electrode of each transistor of the first complementary pair of transistors is coupled to a source electrode of each respective transistor of the second complementary pair of transistors, and to a gate electrode of each respective transistor of the third complementary pair of transistors, to form a fourth node and a fifth node, respectively.

16. The inverter circuit of claim 15, wherein each of the first complementary pair of transistors, the second complementary pair of transistors, and the third complementary pair of transistors comprises:

a p-type metal oxide semiconductor field effect transistor (MOSFET); and an n-type MOSFET.

17. The inverter circuit of claim 15, wherein the first voltage source, the second voltage source, and the third voltage source provide first, second, and third voltages, respectively, and wherein a voltage of the input signal varies between the second voltage and the third voltage.

18. The inverter circuit of claim 17, wherein the output signal provides:

a voltage substantially equal to the third voltage when the voltage of the input signal is substantially equal to the second voltage; and a voltage substantially equal to the second voltage when the voltage of the input signal is substantially equal to the third voltage.

19. The inverter circuit of claim 18, wherein the first voltage is a voltage level such that no transistor from among the first complementary pair of transistors and the second complementary pair of transistors develops a gate-source voltage or a gate-drain voltage in excess of a corresponding maximum gate-source or gate-drain voltage rating for voltage variations in the output signal; and wherein the maximum gate-source and gate-drain voltage ratings are less than or substantially equal to the second voltage.

20. The inverter circuit of claim 18, wherein the first voltage is 1.8 Volts, wherein the second voltage is 3.3 Volts, and wherein the third voltage is 0 Volts.

* * * * *

UNITED STATES PATENT AND TRADEMARK OFFICE
CERTIFICATE OF CORRECTION

| | | |
|---|---|---|
| PATENT NO. | : 8,901,970 B2 | Page 1 of 1 |
| APPLICATION NO. | : 13/852783 | |
| DATED | : December 2, 2014 | |
| INVENTOR(S) | : Alberto Gonzalez | |

It is certified that error appears in the above-identified patent and that said Letters Patent is hereby corrected as shown below:

In the Claims,

Column 7, line 59, please replace "pair" with --pairs--.

Column 8, line 29, please replace "an" with --and--.

Signed and Sealed this
Fourteenth Day of April, 2015

Michelle K. Lee
*Director of the United States Patent and Trademark Office*